United States Patent [19]
Morita

[11] Patent Number: 5,307,118
[45] Date of Patent: Apr. 26, 1994

[54] ELECTROPHOTOGRAPHIC PROCESS CONTROL DEVICE USING FUZZY LOGIC

[75] Inventor: Tetsuya Morita, Yokohama, Japan

[73] Assignee: Ricoh Company, Ltd., Tokyo, Japan

[21] Appl. No.: 854,891

[22] Filed: Mar. 20, 1992

[30] Foreign Application Priority Data

| Mar. 20, 1991 [JP] | Japan | 3-57251 |
| Mar. 20, 1991 [JP] | Japan | 3-57252 |
| Feb. 20, 1992 [JP] | Japan | 4-33714 |

[51] Int. Cl.$^5$ .................................... G03G 21/00
[52] U.S. Cl. ............................. 355/208; 355/204; 355/210; 395/900
[58] Field of Search .............. 355/204, 208, 214, 210, 355/200; 395/900

[56] References Cited

U.S. PATENT DOCUMENTS

| 5,138,380 | 8/1992 | Umeda et al. | 355/208 |
| 5,200,780 | 4/1993 | Koichi | 355/208 |
| 5,204,718 | 4/1993 | Morita | 355/208 X |

FOREIGN PATENT DOCUMENTS

| 53-115233 | 10/1978 | Japan | 355/208 |
| 2-311860 | 12/1990 | Japan | 355/204 |

*Primary Examiner*—A. T. Grimley
*Assistant Examiner*—Shuk Y. Lee
*Attorney, Agent, or Firm*—Oblon, Spivak, McClelland, Maier & Neustadt

[57] ABSTRACT

A device for controlling an electrophotographic process such that a stable latent image is formed on a photoconductive drum in matching relation to changes in the characteristics of a photoconductor. Deterioration detecting sections classify, among the characteristics of the drum, a plurality of drum deterioration factors including the amount of wear, electrostatic fatigue, fatigue due to exposure, the degree of continuous use, temperature and humidity by a time range such as long-term/short-term/day or by a number-of-copy range such as great amount/small amount/day-amount. The deterioration detecting section quantizes each of such degrees of deterioration of the drum by fuzzy inference. A latent image manipulation value determining section determines a charge manipulation value and an exposure manipulation value by fuzzy inference.

15 Claims, 16 Drawing Sheets

SUCCESSOR
CHANGE OF EXPOSURE TIME

MEMBERSHIP FUNCTION RESULTED FROM MAX COMBINATION OF ALL SUCCESSORS

+7%
RESULT OF INFERENCE

RESULTS OF INFERENCE USING SHORT-TERM DETERIORATION FACTORS

RESULTS 2 OF INFERENCE USING REAL-TIME DETERIORATION FACTORS

MAX COMBINATION

WITH SURFACE POTENTIAL MEASUREMENT

+2% RESULTS

WITHOUT SURFACE POTENTIAL MEASUREMENT

+8% RESULTS

ELECTROPHOTOGRAPHIC PROCESS CONTROL DEVICE USING FUZZY LOGIC

BACKGROUND OF THE INVENTION

The present invention relates to a copier, printer, facsimile transceiver or similar electrophotographic apparatus and, more particularly, to an electrophotographic process control device for allowing a stable latent image to be formed on a photoconductive drum included in the apparatus in matching relation to changes in the characteristics of the drum.

A photoconductor for implementing an electrophotographic process has the characteristics thereof relating to charging and exposure changed in a complicated way by various kinds of factors, as well known in the art. Such factors may generally be classified into three kinds, i.e., long-term deterioration factors including the wear and electrostatic fatigue of a photoconductive drum, short-term deterioration factors including fatigue due to exposure and the duration of suspension, and real-time deterioration factors including temperature. The optimal control methods for the charge potential and the amount of exposure depend on the kind of deterioration factors. It has been customary with an electrophotographic process to prepare a look-up table listing adequate control values associated with the outputs of a surface electrometer and a photosensor and determined by experiments. During actual control, the look-up table is referenced to control each parameter. A conventional PID (Proportional, Integral and Differential) system or similar control system is available for various purposes since it has a simple construction and allows control parameters thereof to be adjusted with ease. Regarding the control over a latent image, it is a common practice to measure the surface potential of the drum by a surface electrometer and set up a target potential by controlling the amount of charge and the amount of exposure.

However, the problem with the conventional control system is that the look-up table has to be prepared by a prohibitive number of experiments and, in addition, a considerable amount of data for control are necessary. Moreover, since the control is effected without specifying any of the deterioration classes, the control system has only a limited range of applicability and often causes the apparatus to run out of control. A grid, photoconductive drum and other parts included in an electrophotographic copier have their characteristics changed or deteriorated in association with the number of copies produced, temperature and humidity, toner concentration, fatigue of a developer, etc. This is apt to smear the background of a reproduction or to render the image density irregular, preventing stable image quality from being achieved. Further, in a conventional copier susceptible to the internal and external conditions as stated above, when a charge deposited on the drum by, for example, a charger using a grid voltage is partly dissipated by a laser beam issuing from a laser diode (LD) to form a latent image, it is likely that the surface potential of the photoconductor changes due to the deterioration of the drum and charger to prevent the resulting image from having a sufficient density, or that the residual potential is increased due to, for example, continuous copying to smear the background of a reproduced image. On the other hand, with the PID or similar control system, it is difficult to control a complicated object or a system whose dynamic characteristic frequently changes. The drawback with a system of the type measuring the surface potential of the photoconductive drum by an electrometer, controlling the amount of charge and the amount of exposure to produce a target image potential, and then controlling the potential of a latent image to be formed on the drum is that an exclusive latent image pattern for measurement has to be formed on the drum, slowing down, for example, the copying operation of a copier.

SUMMARY OF THE INVENTION

It is, therefore, an object of the present invention to provide an electrophotographic process control device capable of controlling an electrophotographic process such that a stable latent image is formed on the drum in matching relation to changes in the characteristics of a photoconductor.

In accordance with the present invention, an electrophotographic process control device comprises deterioration detecting sections for classifying, among characteristics of a photoconductive drum used for an electrophotographic process, drum deterioration factors including an amount of wear, electrostatic fatigue, a degree of continuous use, temperature and humidity by a time range such as long-term/short-term/day or by a number-of-copy range such as great amount/small amount/day-amount, and quantizing the degrees of deterioration of the drum by fuzzy inference, and a latent image manipulation value determining section for determining a charge manipulation amount and an exposure manipulation amount by fuzzy inference in response to amounts of deterioration fed from the deterioration detecting sections.

Also, in accordance with the present invention, in an electrophotographic process control device, among characteristics of a photoconductive drum used for an electrophotographic process, an amount of wear of the drum, electrostatic fatigue, fatigue due to exposure, a degree of continuous use, a total number of drum rotations, a total amount of passed charge, a total duration of exposure and a number of copies per unit time are each defined as a membership function. Fuzzy rules have two or more of the factor series as an antecedent portion and have a grid voltage and a duration of exposure of a light source which are the subjects of control as a successor portion. Control is effected with nonfuzzy values of the results of inference using the fuzzy rules.

Further, in accordance with the present invention, in an electrophotographic process control device, among characteristics of a photoconductive element used for an electrophotographic process, an amount of drum wear, electrostatic fatigue, fatigue due to exposure, a degree of continuous use, temperature, humidity and other drum deterioration factors are classified by a time range such as long-term/medium-term/day or a number-of-copy range such as great amount/medium amount/day-amount. Membership functions are prepared for evaluating amounts representative of the deterioration of a photoconductor on the basis of sensor information including a drum surface potential and a drum current and environment information including a number of copies, temperature and humidity. Fuzzy rules having the amounts representative of the deterioration of the photoconductor as an antecedent portion and amounts of manipulation of a subject of control as a successor portion are prepared. Control is effected by use of non-fuzzy values of the results of inference using the fuzzy rules.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
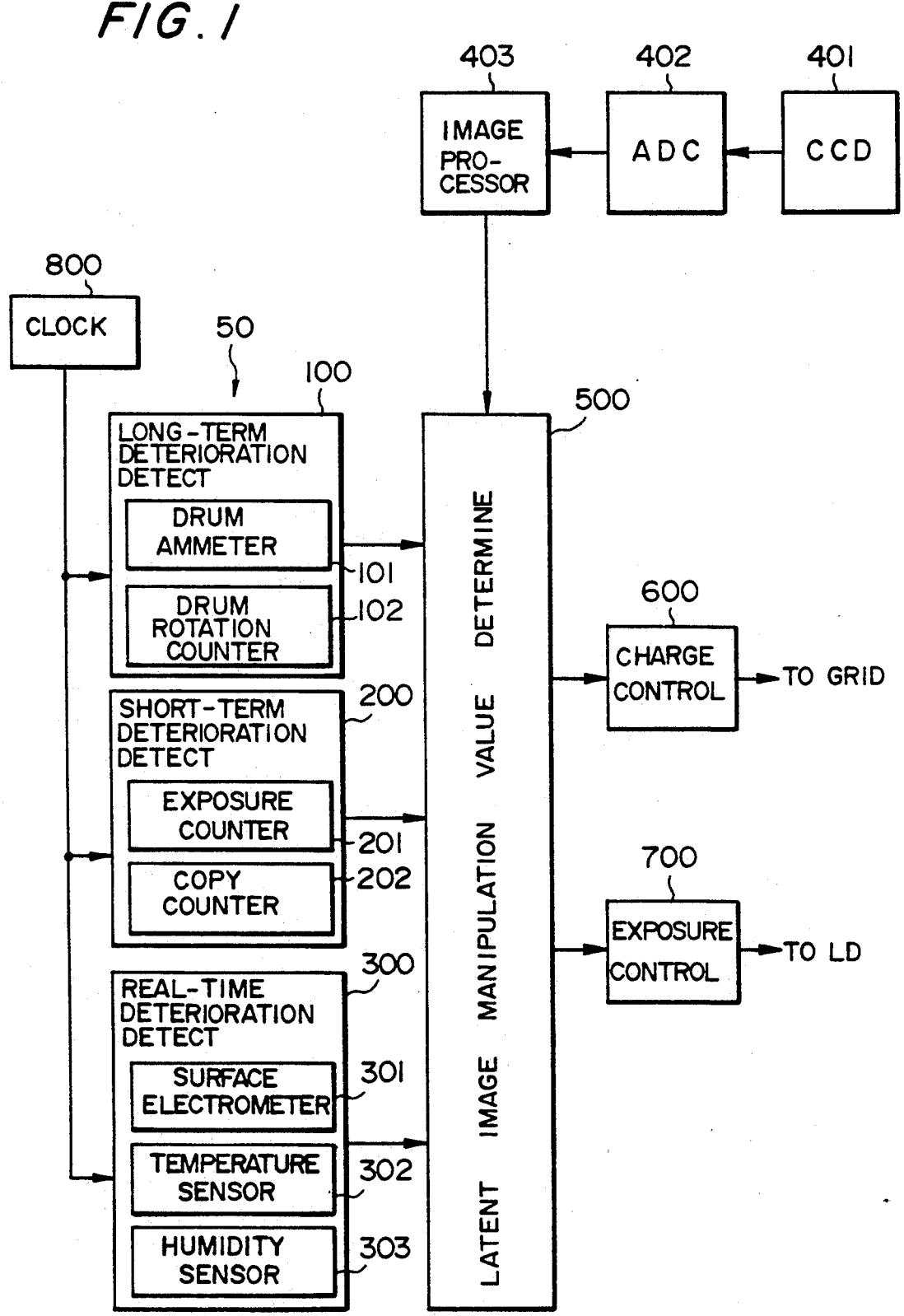
FIG. 1 is a block diagram schematically showing an electrophotographic process control device embodying the present invention.
Figure 2:
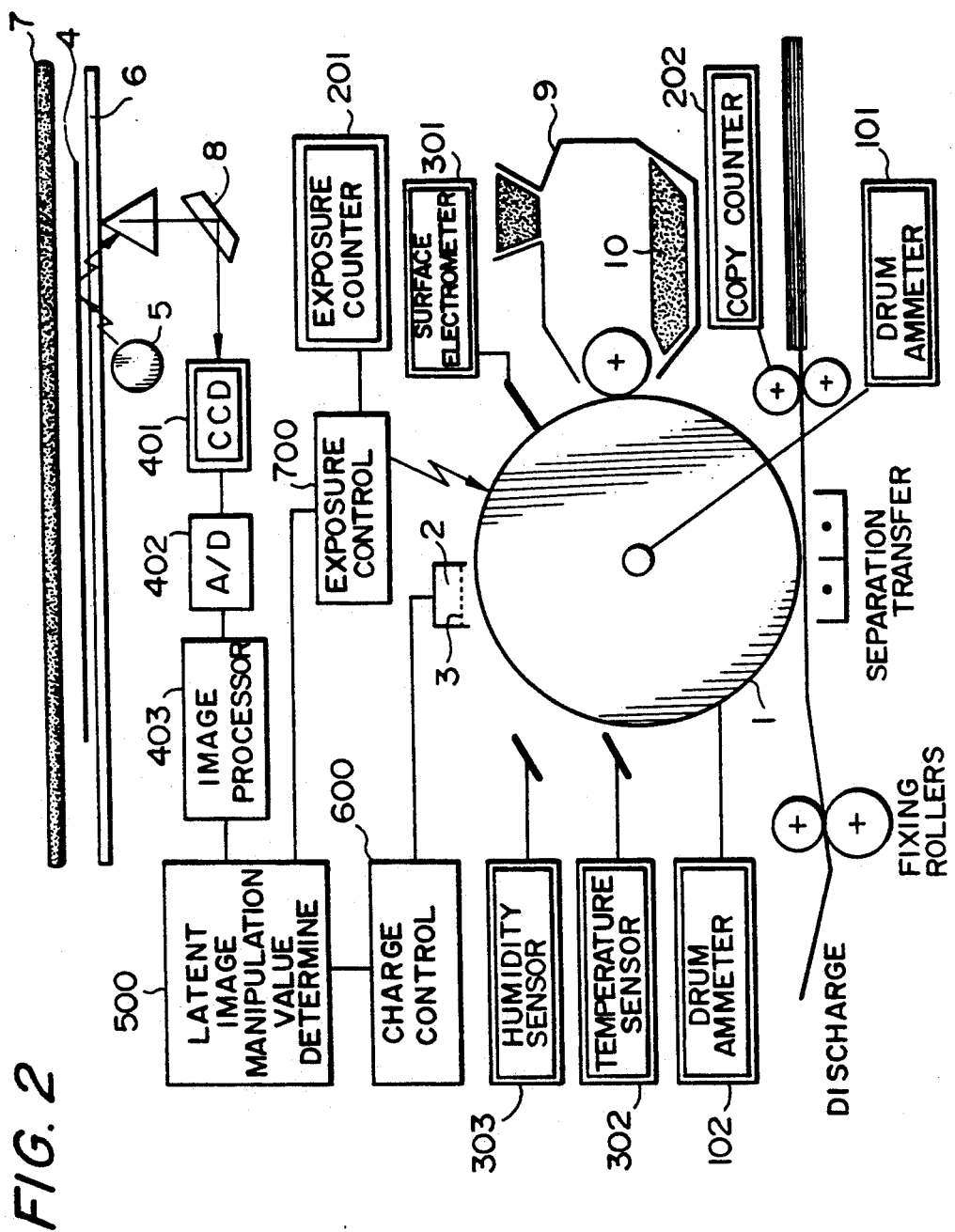
FIG. 2 is a block diagram schematically showing sensors included in the embodiment and the subjects of control.

Referring to FIGS. 1 and 2, an electrophotographic process control device embodying the present invention is shown and includes a long-term deterioration detecting section 100 and a short-term deterioration detecting section 200. The former section 100 measures the electrostatic fatigue, wear and other long-term deterioration factors particular to a photoconductive drum 1, while the latter section 200 measures the fatigue of the drum 1 ascribable to exposure, the degree of continuous use and other short-term deterioration factors. A real-time deterioration detecting section 300 measures the surface potential, temperature, humidity and other real-time deterioration factors of the drum 1. A CCD (Charge Coupled Device) image sensor 401 reads a document image to produce an image signal. An analog-to-digital converter (ADC) 402 converts the image signal to a digital image signal. An image processor 403 subjects the digital image signal to various kinds of processing including correction to thereby output image data to be written. A latent image manipulation value determining section 500 outputs manipulation values meant for a charging section and an exposing section in response to the image data from the image processor 403, the long-term deterioration information from the detecting section 100, the short-term deterioration information from the detecting section 200, and the real-time deterioration information from the detecting section 300. A charge control section 600 controls the potential for charging the drum 1 in terms of the voltages of a charger 2 and a grid 3 located at the charging section. An exposure control section 700 controls the intensity of light for illuminating a document 4 in terms of an output thereof to, for example, a laser diode (LD) located at the exposing section.

The long-term deterioration detecting section 100 has a drum ammeter 101 for measuring a current passing through the drum, and a drum rotation counter 102 for counting the rotations of the drum 1. The short-term deterioration detecting section 100 has an exposure counter 201 for measuring the duration of exposure of the drum 1 by the LD, and a copy counter 202 for counting copies produced. The real-time deterioration detecting section 300 has a surface electrometer 301 responsive to the surface potentials of an image area and a white area formed on the drum 1, and a temperature sensor 302 and a humidity sensor responsive to, respectively, temperature and humidity around the drum 1.

FIG. 2 shows the general arrangement of the sensors included in the embodiment and the subjects of control. A lamp, e.g., a halogen lamp 5 illuminates a document 4 existing between a glass platen 6 and a cover plate 7. The resulting reflection from the document 4 is incident to the CCD image sensor 401 via a mirror 8 as well as other optical elements. The image signal from the image sensor 401 is digitized by the ADC 402, processed by the image processor 403, and then fed to the latent image manipulation value determining section 500. In response, this section 500 determines manipulation values meant for the charging and exposition sections and delivers them to the charge control section 600 and exposure control section 700, as stated earlier. Among the parts and elements constituting the device of FIG. 2, the drum 1 and grid 3, for example, have their characteristics changed or deteriorated in association with the number of copies, ambient temperature and humidity, the toner concentration of a developer 10 stored in a developing unit 9, the fatigue of the developer 10, etc. Should a copying operation be performed without taking account of the change or the deterioration of such characteristics due to aging, the resultant copy would have the background thereof smeared or would suffer from an irregular density distribution. For example, when the charge deposited on the drum 1 is partly dissipated by the discharge of the charger 2 caused by the voltage of the grid 3 so as to form a latent image on the drum 1, it is likely that the surface potential of the drum 1 changes due to the deterioration of the drum 1 and charger 2. Then, the density of the output image would be short and/or the background of the image would be smeared due to the increase in the residual potential derived from, for example, continuous copying.

In light of the above, the embodiment prepares membership functions by classifying the deterioration factors of the drum 1, i.e., measurable parameters by the time range or the number-of-copy range, and uses an optimal control system class by class so as to implement efficient and safe control.

Figure 3:
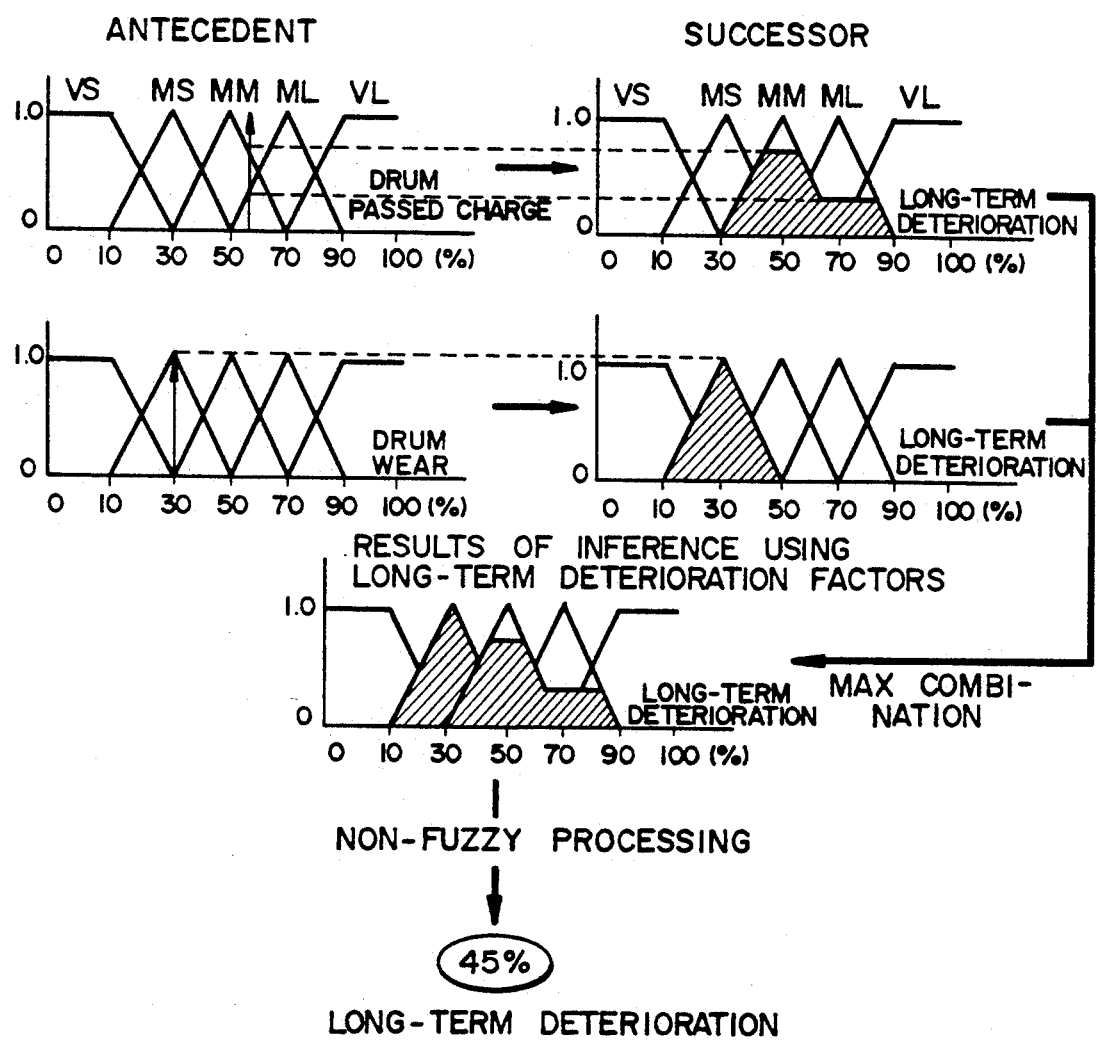
FIG. 3 demonstrates fuzzy rules relating to long-term deterioration factors particular to the embodiment, and a method of calculating an amount of long-term deterioration by using the fuzzy rules.

FIG. 3 demonstrates fuzzy rules relating to the long-term deterioration factors of the embodiment shown in FIGS. 1 and 2, and a method of calculating an amount of long-term deterioration by using the fuzzy rules. Specifically, two membership functions associated with the amount of charge passing through the drum 1 and the amount of wear of the drum 1 constitute an antecedent portion. Membership functions each being associated with one of the two antecedent functions and representative of an amount of long-term deterioration constitute a successor portion. Based on such MAX combination processing, the embodiment effects fuzzy inferences based on long-term deterioration factors. In the successor portion, hatching indicates portions corresponding to input values to the respective membership functions of the antecedent portion.

Figure 4:
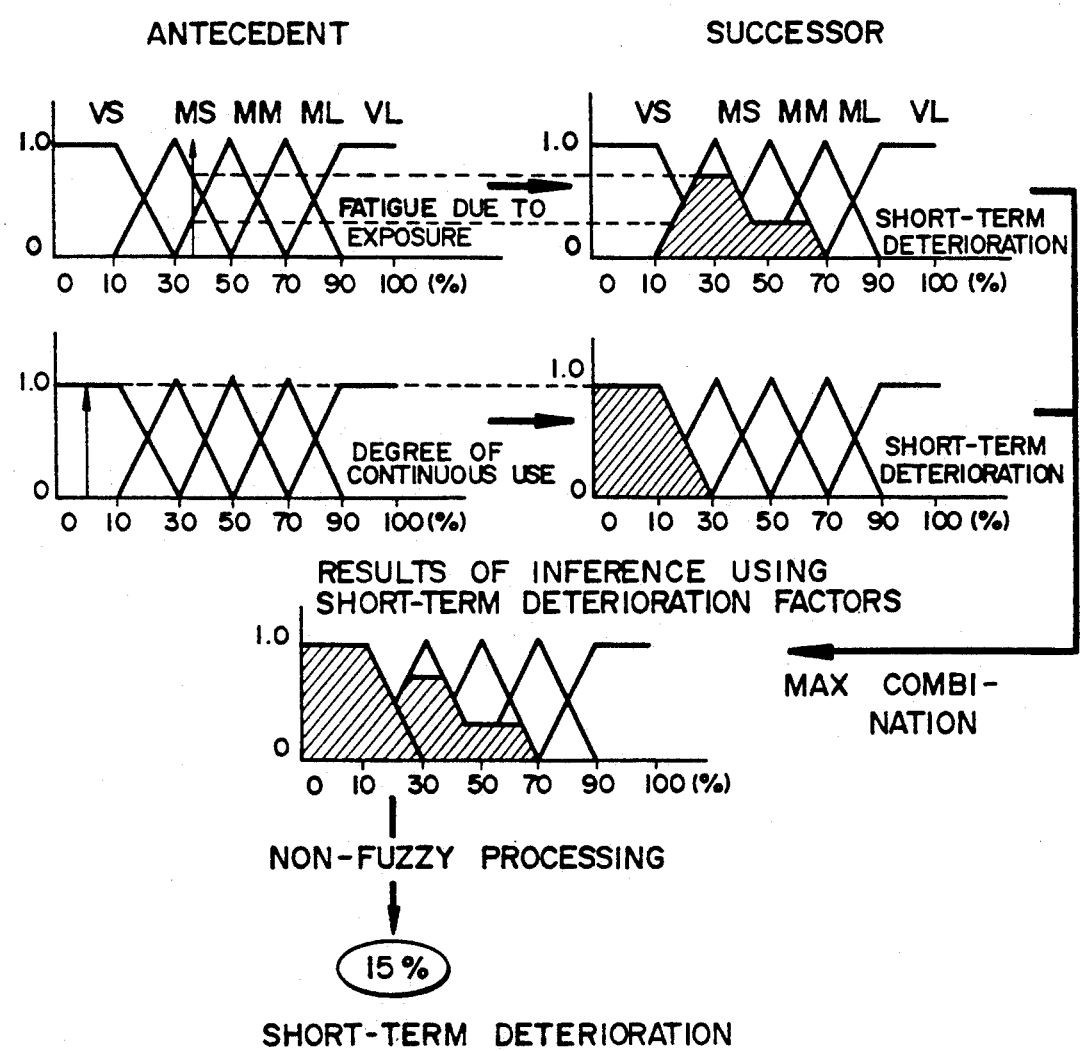
FIG. 4 shows fuzzy rules relating to short-term deterioration factors particular to the embodiment, and a method of calculating an amount of short-term deterioration by using the fuzzy rules.

FIG. 4 shows fuzzy rules relating to the short-term deterioration factors, and a method of calculating an amount of short-term deterioration by using the fuzzy rules. In FIG. 4, the two membership functions associated with the fatigue due to exposure and the degree of continuous use constitute an antecedent portion. The successor portion consists of membership functions each being indicative of an amount of short-term deterioration. By such MAX combination processing, the embodiment effects fussy inferences based on the short-term deterioration factors.

Figure 5:
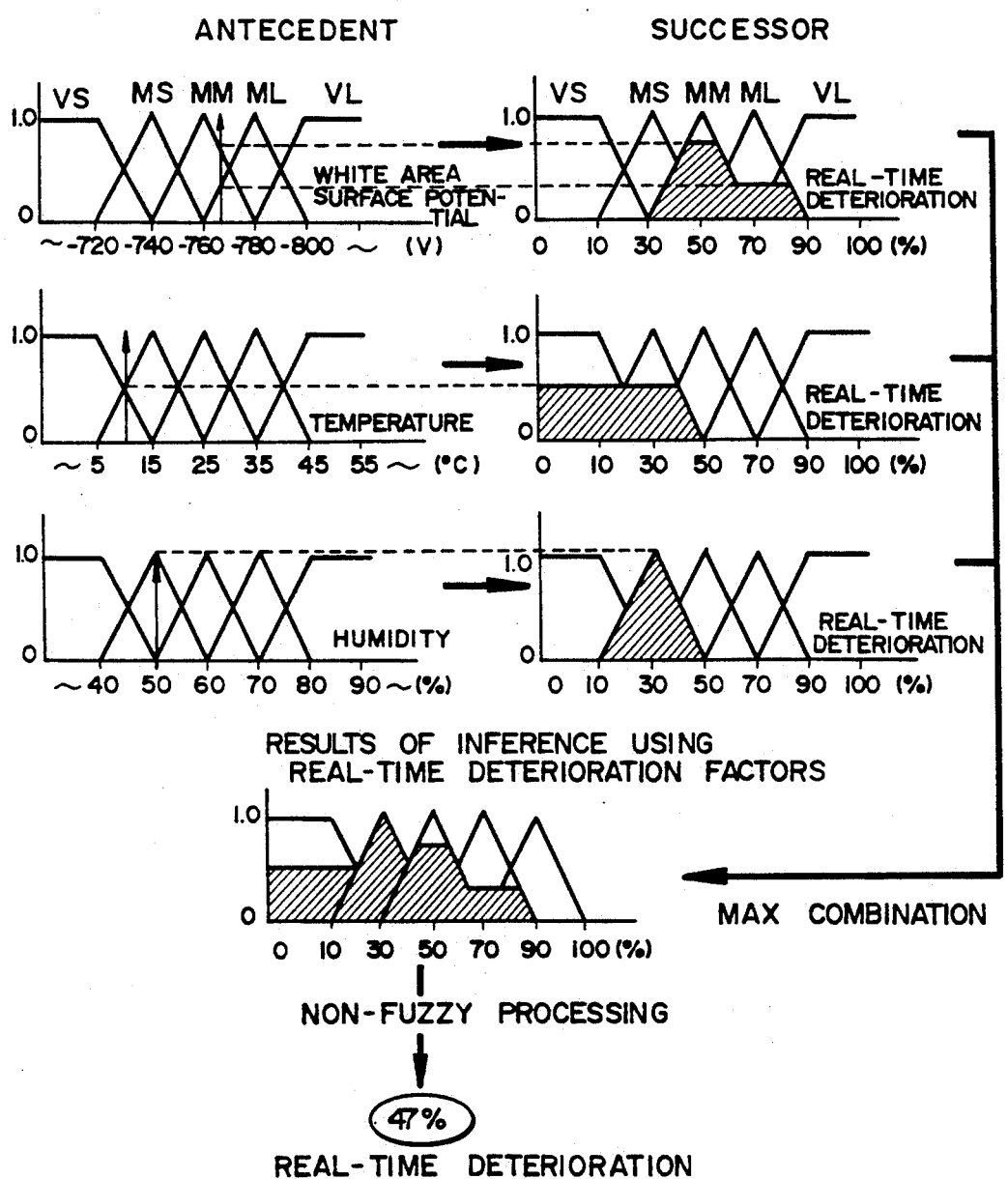
FIG. 5 shows fuzzy rules relating to real-time deterioration factors particular to the embodiment, and a method of calculating an amount of real-time deterioration by using the fuzzy rules.

Further, FIG. 5 shows fuzzy rules relating to the real-time deterioration factors, and a method of calculating an amount of real-time deterioration by using the fuzzy rules. In FIG. 3, three membership functions associated with the surface potential of a white area, temperature and humidity, respectively, constitute an antecedent portion. Membership functions each being associated with respective one of the antecedent factors and indicative of an amount of real-time deterioration constitute a successor portion. Fuzzy inferences are effected on th basis of the real-time deterioration factos.

Figure 6:
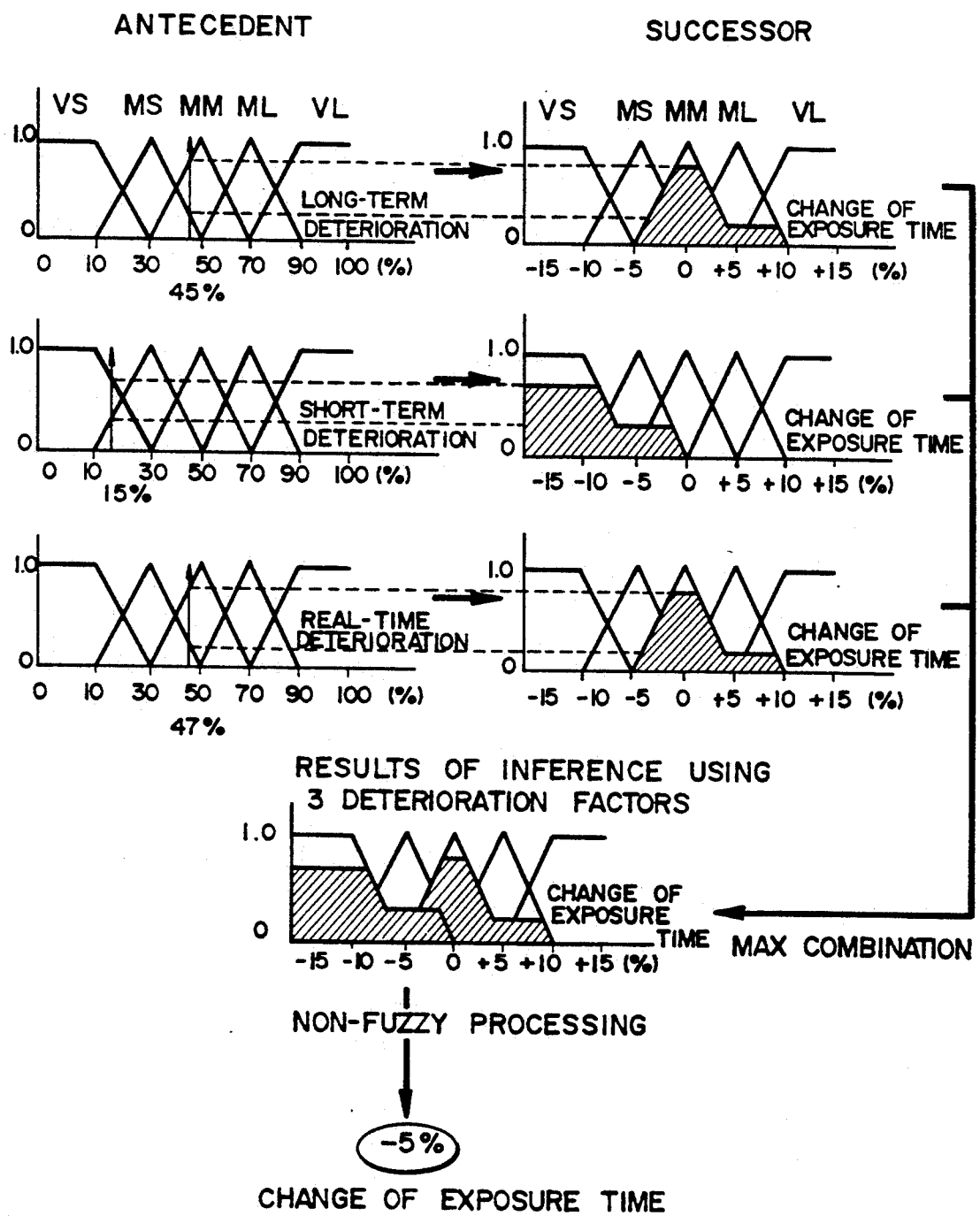
FIG. 6 is representative of a method of determining an amount of change of the duration of exposure by the fuzzy inferences shown in FIGS. 3-5.

FIG. 6 demonstrates a method of determining an amount for the duration of exposure to be changed, using the amounts of deterioration produced by the methods of FIGS. 3-5. In FIG. 6, three membership functions, i.e., an amount of long-term deterioration, an amount of short-term deterioration and an amount of real-time deterioration constitute an antecedent portion. Membership functions each being associated with the antecedent functions and indicative of an amount of change of the duration of exposure are shown in the successor portion. By such MAX combination processing, the embodiment effects fuzzy inferences based on the time range factors. In FIG. 6, hatching indicates portions of the successor portion corresponding to input vaues to the respective antecedent membership function.

Figure 7:
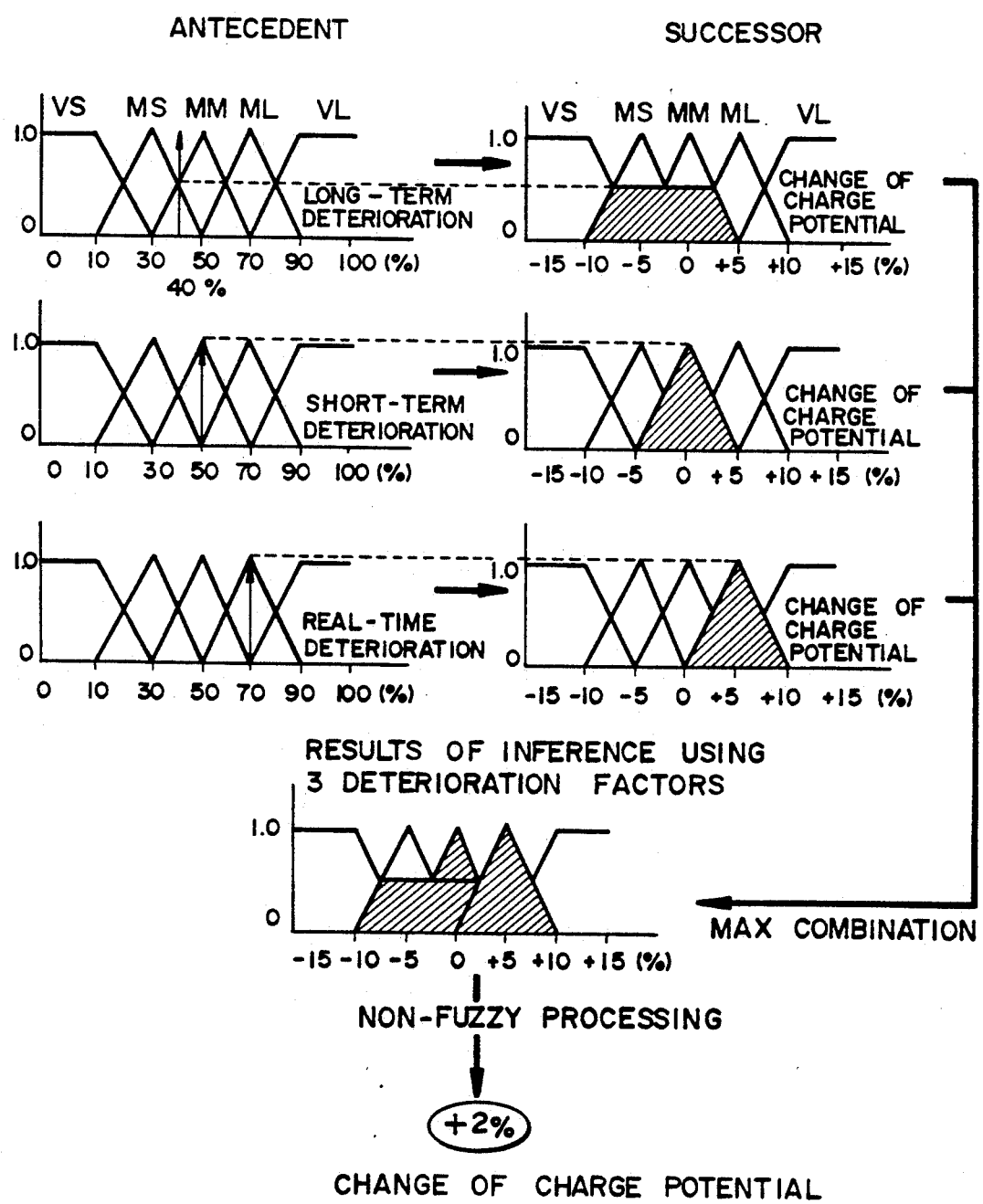
FIG. 7 is representative of a method of determining an amount of change of charge potential by the fuzzy inferences shown in FIGS. 3-5.

FIG. 7 shows a method of determining an amount for the charge potential to be changed, by also using the amounts of deterioration produced by the methods of FIGS. 3-5. Three membership functions shown in FIG. 7, i.e., an mount of long-term deterioration, an amount of short-term deterioration and an amount of real-time deterioration consitute an atecedent portion. Membership functions each being associated with respective one of the antecedent functions and representative of an amount of change of charge potential constitute a successor portion. By such MAX combination, the embodiment effects fuzzy inferences based on the number-of-copy range factors. In FIG. 7, hatching indicates portions of the successor portion corresponding to input values to the respective antecedent membership functions.

The specific condition shown in FIG. 1 shows that the latent image manipulation value determining section 500 generates some parameters relating to the condition of the drum 1 out of a clock 800 and the currents and voltages of various sections, the contents of counters, temperature, humidity and other information which are fed from the sensor section 50. The charge and exposure are controlled in matching relation to such parameters and image data output from the image processor 403. Specific parameters relating to the condition of the drum 1 and a method of calculating them are as follows.

To begin with, the drum surface potential, or first parameter, is measured by forming a predetermined latent image pattern on the drum 1 and then measuring the surface potentials of the image area and white area of the drum 1 by the electrometer 301. At this instant, stabilizing the surface potential at a target value is the object of latent image control. The amount of charge passing through the drum 1, or second parameter, is determined by measuring a current fed from the charger 2 to the drum 1 by the ammeter 101 and then integrating the current by the duration of use of the drum 1. Specifically, the drum 1 has the sensitivity thereof sequentially reduced due to the long-term repetition of charge and discharge. The amount of charge passing the drum 1 may be represented by percentage to the usable limit (maximum rated value) of the drum 1. The amount of wear of the drum 1, or third parameter, is substantially proportional to the total number of rotations of the drum 1. Specifically, the electrostatic capacity of the drum 1 decreases since the surface of the drum 1 is sequentially shaved off in frictional contact with a cleaning section, blade, etc. The amount of wear of the drum 1 is determined in terms of the count of the drum rotation counter 102 and is represented by percentage to the usable limit (maximum rated value) of the drum 1.

The amount of fatigue of the photoconductive element, or fourth parameter, is substantially proportional to the total duration of exposure of the drum 1. Specifically, the drum 1 has the sensitivity thereof changed even by the short-term repetition of exposure; the more frequent the exposure, the lower the sensitivity. Hence, the amount of fatigue is determined in terms of the count of the exposure counter 201 and is represented by percentage to the usable limit (maximum rated value) of the drum 1. The degree of continuous use, or fifth parameter, is indicative of the number of copies produced over a predetermined period of time from the past to the present. Such a value means a ratio between the short-term period of use and the period of suspension of, for example, a copier. As the drum 1 is continuously used, the sensitivity thereof falls while a residual potential occurs. Therefore, the degree of continuous use is represented by the count of the copy counter 202. Further, temperature, or sixth parameter, and humidity, or seventh parameter, are measured by the temperature sensor 302 and the humidity sensor 303, respectively. The sensitivity of the drum 1 is noticeably susceptible to temperature and humidity because of the change in the electrostatic capacity of the drum and a leakage current after charging and other causes, although it is difficult to determine how they are directly related.

The present invention combines the above-stated parameters to produce information for quantizing long-term, short-term and real-time deteriorations of, for example, the drum 1, and then determines a charge manipulation value and an exposure manipulation value on the basis of such information and image data to be written. The control is generally classified into two kinds, i.e., control over the charging section and the control over the exposing section. For the control over the charging section, the fuzzy rules shown in FIGS. 3–6 are used.

How to determine an amount of long-term deterioration will be described with reference to FIG. 3 specifically. In FIG. 3, MS, MM, ML and VL means Very Small, Medium Small, Medium, Medium Large, and Very Large, respectively, and are equivalent to five fuzzy rules. Therefore, regarding a rule relating to the charge passing through the drum, that if the "charge passing through the drum" is VS, then the amount of "long-term deterioration" is VS is one fuzzy rule. Specifically, when the amount of charge of interest is 57% of the maximum rated value, MM and ML are selected in the antecedent portion with the result that hatched portions of the membership functions of the successor portion corresponding to 57% of the antecedent potion are obtained. Likewise, when the amount of wear of the drum is 30% of the maximum rated value, MS is selected in the antecedent portion of the membership functions with the result that the hatched portions of the successor portion corresponding to 30% of the antecedent portion are obtained. MAX combination of the above two membership functions derives an amount of long-term deterioration also indicated by hatching in the figure. In the same manner, an amount of short-term deterioration and an amount of real-time deterioration are otainable in FIGS. 4 and 5, respectively. In FIG. 6, by inputting the results shown in FIGS. 3–5, it is possible to obtain an amount by which the duration of exposure should be changed. The final exposure manipulation value for the subject of control can be produced by the determining section 500 by making the hatched portions of the membership functions of the amount of change non-fuzzy. For this purpose, the center of gravity of the hatched portions or the areas of the hatched portions may be calculated.

For the control over the charging section, the fuzzy rules shown in FIGS. 3–5 and FIG. 7 are used. In FIG. 7, amounts of long-term, short-term and real-time deterioration are calculated by the respective fuzzy rules shown in FIGS. 3–5. The determining section 500 produces the final charge manipulation value by determining a relation of the charge manipulation value to the amounts deterioration by using the same rules as with the exposure manipulation value meant for the exposure control section. The inference method slightly differs from the case with surface potential measurement to the case without it. Specifically, in the former case short-term and real-time deterioration information are subjected to MAX combination as two membership functions while, in the latter case, only short-term information is used. This is because surface potential cannot be measured unless a predetermined exclusive pattern for measurement is formed between successive copying operations. More specifically, the potentials of an image area and a white area on the drum 1 cannot be measured with a desired document image and have to be measured with a predetermined pattern formed on the drum 1. Therefore, two different kinds of methods are needed.

An alternative embodiment of the present invention will be described hereinafter. In the following embodiment, the same or similar functional blocks or sections will be designated by the same reference numerals, and redundant description will be avoided for simplicity.

In this embodiment, the characteristics of the drum 1 which cannot be directly measured are represented by the combination of membership functions of measurable parameters. Specifically, among the characteristics of the drum 1, the wear, electrostatic fatigue, fatigue due to exposure, and the degree of continuous use are defined as membership functions in terms of the total number of drum rotations, the total amount of passed charge, the total amount of exposure, and the number of copies per unit time. Fuzzy rules are prepared by using two or more of such factors as the antecedent and using the grid voltage and the duration of illumination by the light source (LD) as the successor. The control is effected on the basis of values which are the non-fuzzy values of the results of inferences using the above fuzzy rules. During the control, an optimal control system is selectively applied to each of the deteriorations. Stated another way, the manipulation value is selectively changed with, among the deterioration factors calculated by the above fuzzy rules, one having the greatest effect.

Figure 8:
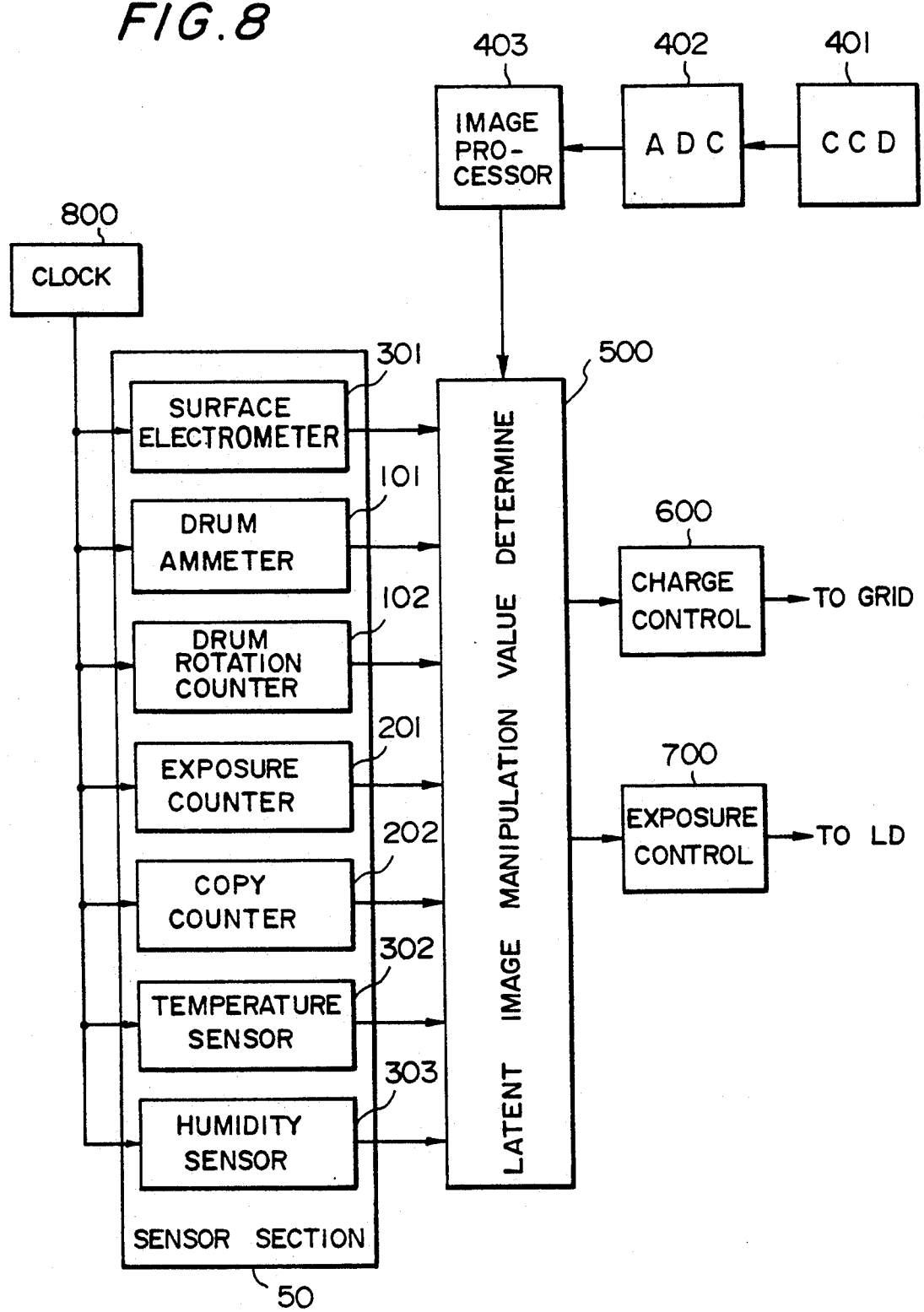
FIG. 8 is a block diagram showing an alternative embodiment of the present invention.

FIG. 8, like FIG. 1, shows a specific condition of the electrophotographic process section in which currents and voltages of various sections, counts, temperature, humidity and other information output from the sensor section 50 and the clock 800 are used to generate some different parameters relating to the condition of the drum 1, and these parameters and the image data from the image processor 403 are used to control charging and exposure.

Figure 9A:
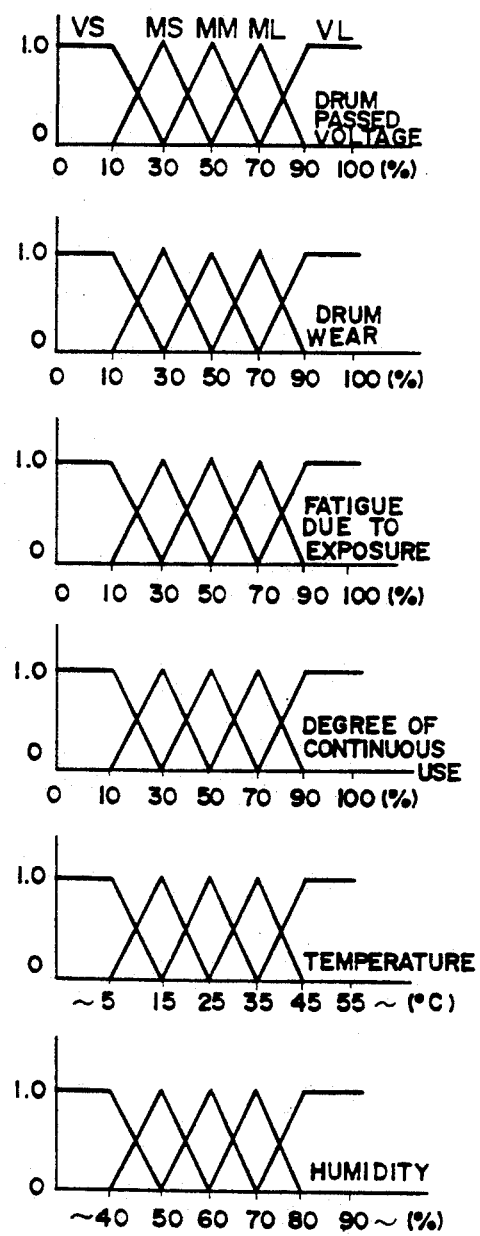
FIG. 9 shows specific fuzzy rules for determining an amount of change of grid voltage by the devices shown in FIGS. 2-8.
Figure 9B:
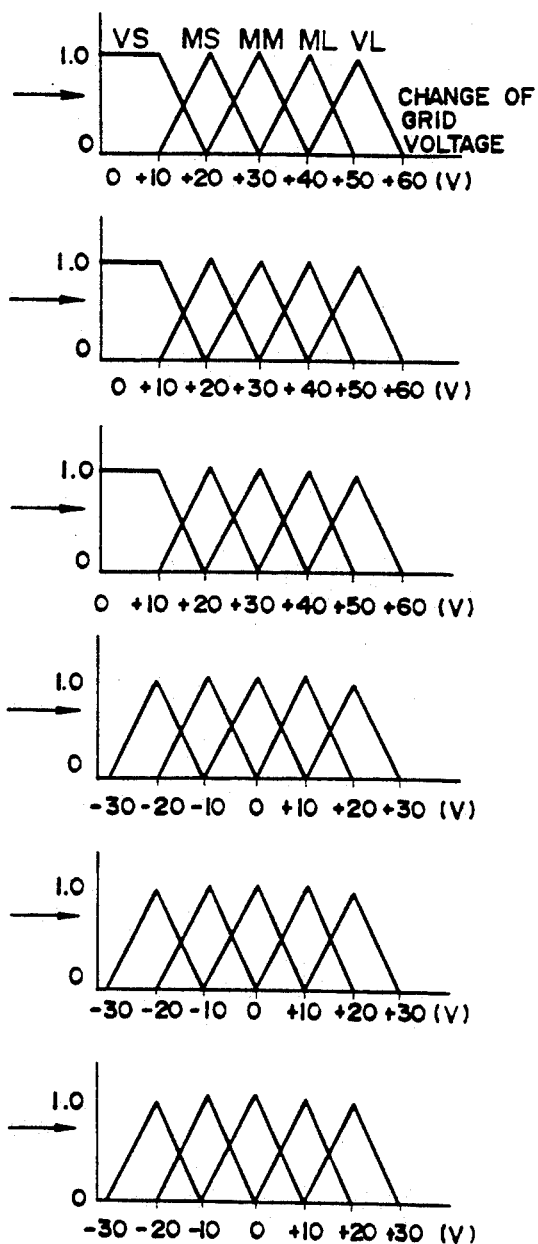

FIG. 9 is representative of fuzzy rules for determining an amount by which the grid voltage should be changed, using the charge passed through the drum 1 and temperature and humidity shown in FIG. 8. Membership functions (a) shown in FIG. 9 constitute an antecedent portion while the amounts of change of grid voltage (b) constitute a successor portion of the associated membership functions.

Figure 10A:
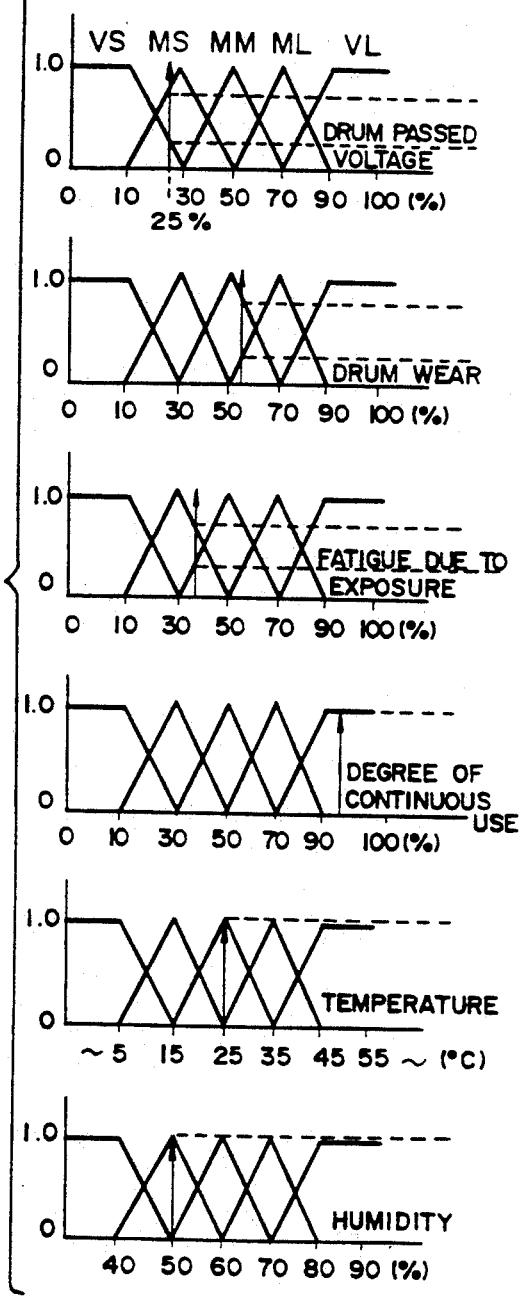
FIG. 10 shows specific fuzzy rules for determining an amount of change of the duration of exposure by the devices shown in FIGS. 2 and 8.
Figure 10B:
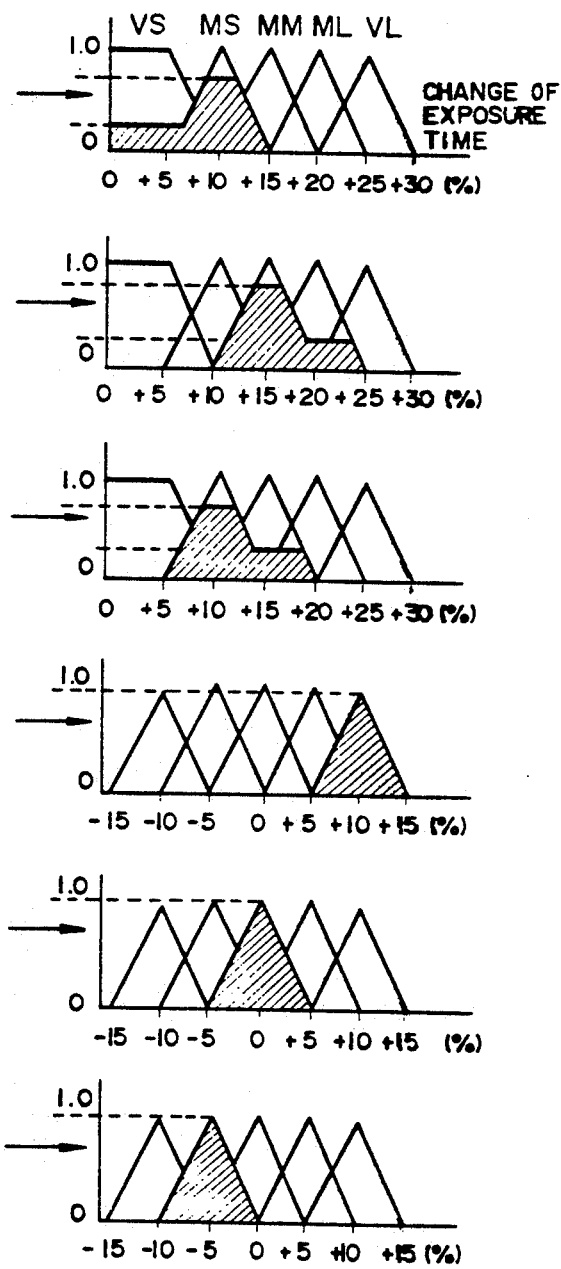

FIG. 10 shows fuzzy rules for effecting the control over exposure. Membership functions (a) shown in FIG. 10 constitute an antecedent portion while the amounts of change of the duration of exposure (b) constitute a successor portion of the associated membership functions. In FIG. 10, hatching indicate portions of the successor portion corresponding to inputs to the antecedent portion and useful for understanding an inference procedure which will be described.

Since the parameters shown in FIG. 8 and relating to the drum condition are similar to those shown in FIG. 1, such parameters and a method of calculating them will not be described. Among the parameters, the drum surface potential cannot be measured unless an exclusive pattern for measurement is formed on the drum 1. Since the exclusive pattern slows down, for example, the copying operation of a copier, the number of times that such a pattern is formed should be as small as possible. When the process control is effected by using sensor information and long-term deterioration factors which are achievable without resorting to any special pattern, the number of times that the pattern is formed can be reduced or can even be zero.

Specifically, the wear of the drum 1, fatigue due to charging, the degree of continuous use and other factor are defined as membership functions using parameters which have substitute characteristics, and then manipulation values are determined by fuzzy inferences on the basis of the membership functions and fuzzy control rules prepared beforehand. In FIG. 9, VS, MS, MM, ML and VL of the antecedent portion and successor portion mean Very Small, Medium Small, Medium, Medium Large and Very Large, respectively, and are equivalent to five fuzzy rules. Hence, regarding the amount of charge passed through the drum 1, that if the "amount of charge" is VS, then the "change of the grid voltage" should be VS is one fuzzy rule.

Figure 11:
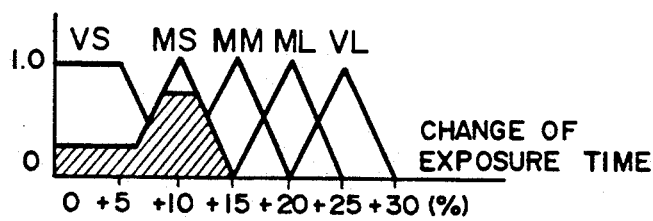
FIG. 11 demonstrates a procedure for producing a manipulation value by the fuzzy inferences with the devices shown in FIGS. 2 and 8.
Figure 11:
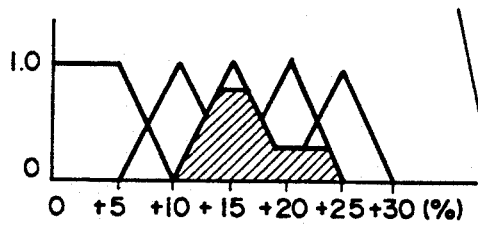
Figure 11:
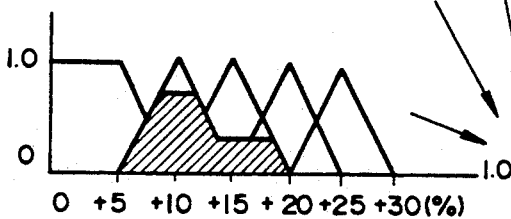
Figure 11:
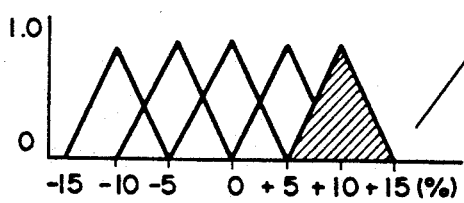
Figure 11:
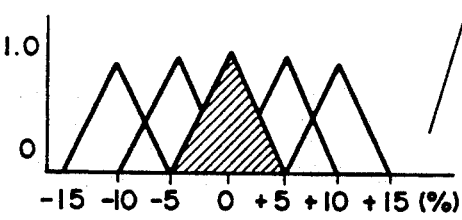
Figure 11:
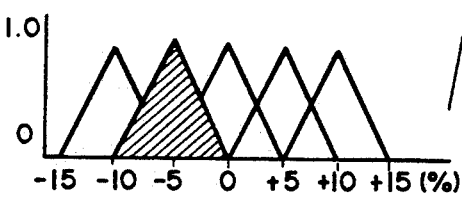
Figure 11:
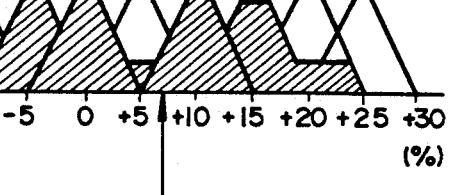

FIG. 10 shows fuzzy rules for determining an amount of change of the duration of exposure. A specific interference procedure will be described by using the rules relating to the amount of charge passed through the drum 1. In FIG. 10, when the amount of charge is 25% of the maximum rated value, VS and MS are selected in the antecedent portion. Hatching in the successor portion indicates membership characteristics corresponding to 25% of the antecedent portion. Likewise, membership functions in the successor portion which correspond to the wear of the drum 1, fatigue ascribable to exposure, the degree of continuous use, temperature and humidity are obtainable, as indicated by hatching. By the MAX combination of the results of the successor portion, membership functions of the change of the duration of exposure are obtained, as shown in FIG. 11. The final manipulation value to be sent to the subject of control is produced by making the hatched portions of the membership functions non-fuzzy.

Another alternative embodiment of the present invention will be described hereinafter. Again, the same or similar parts and elements as those of the previous embodiment are designated by the same reference numerals, and redundant description will be avoided for simplicity. In this embodiment, the characteristics of the drum 1 which cannot be directly measured are represented by the combination of membership functions of measurable parameters.

Figure 12:
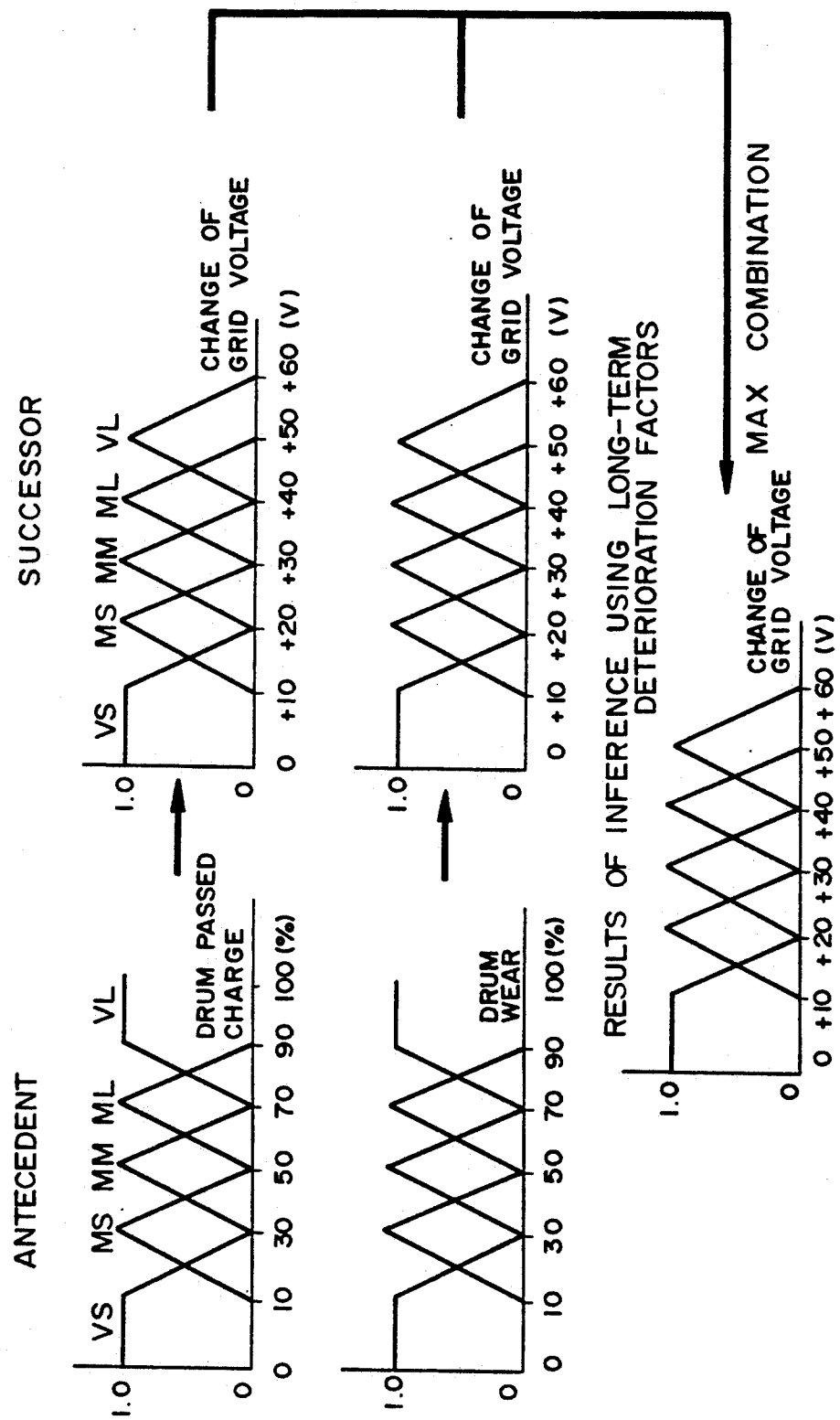
FIG. 12 shows a specific inference procedure with fuzzy rules for determining an amount of change of grid voltage on the basis of long-term deterioration factors of an electrophotographic copier in accordance with the present invention.
Figure 14:
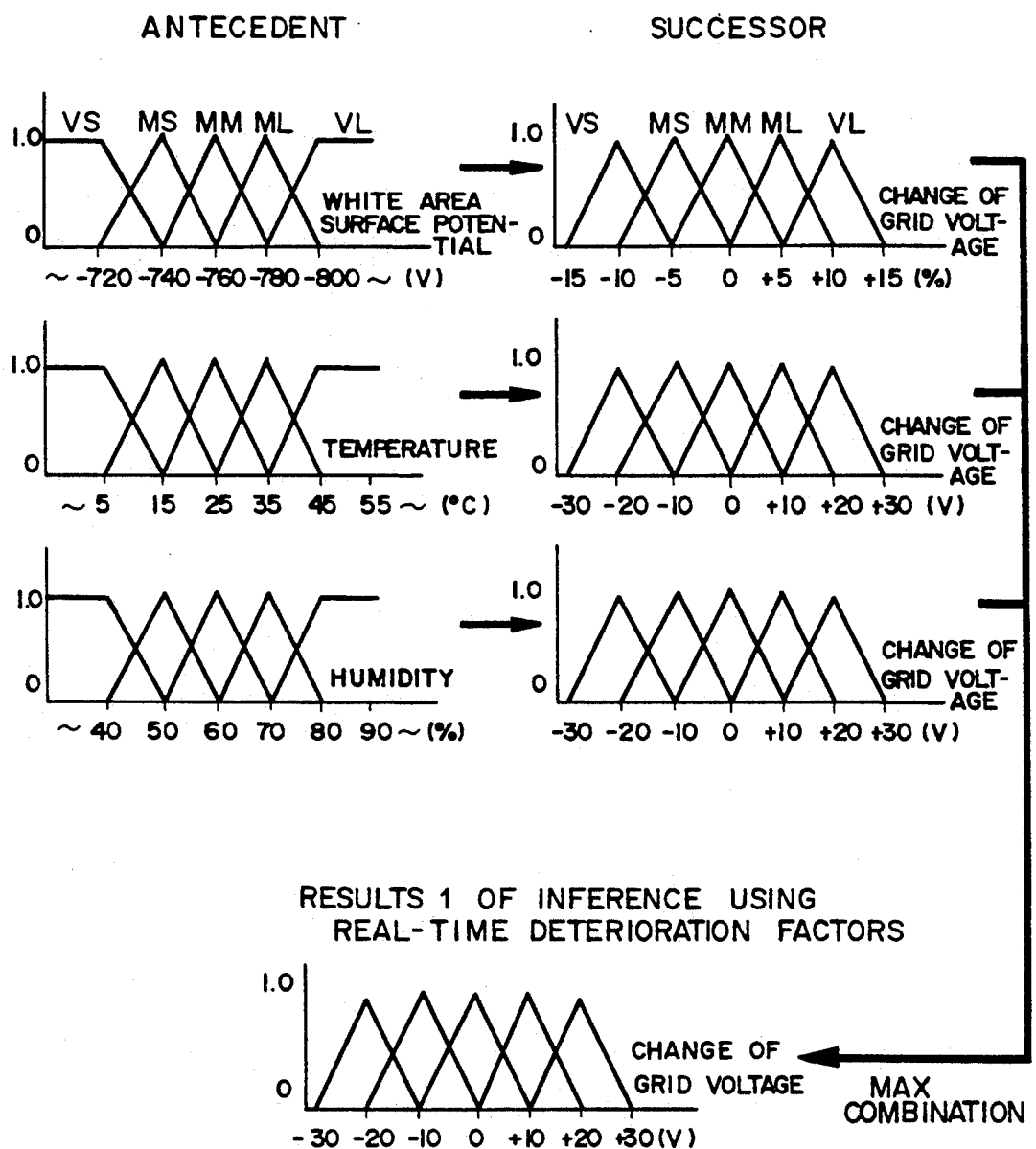
FIG. 14 shows a specific inference procedure with fuzzy rules for determining an amount of change of grid voltage on the basis of real-time deterioration factors of an electrophotographic copier in accordance with the present invention.

The embodiment combines the above-stated parameters to produce long-term, short-term and real-time deterioration information and, based on such information and image data, determines a charge manipulation value and an exposure manipulation value. At this instant, the basic operation flow may generally be classified into two parts, i.e., control over the charging section and control over the exposing section. For the control over the charging section, rules shown in FIGS. 12 and 14 are used. Specifically, long-term and real-time deterioration information are determined independently of each other and then subjected to MAX combination to produce the final control value. It should be noted, however, that since real-time deterioration information is not achievable unless an exclusive pattern for surface potential measurement is formed, the method of determining the operation value differs from the case with such a pattern to the case without it. Since details of the method of calculating the manipulation values are the same as those of the above-stated method, the method will be briefly described by taking the control over the exposing section as an example.

Figure 13:
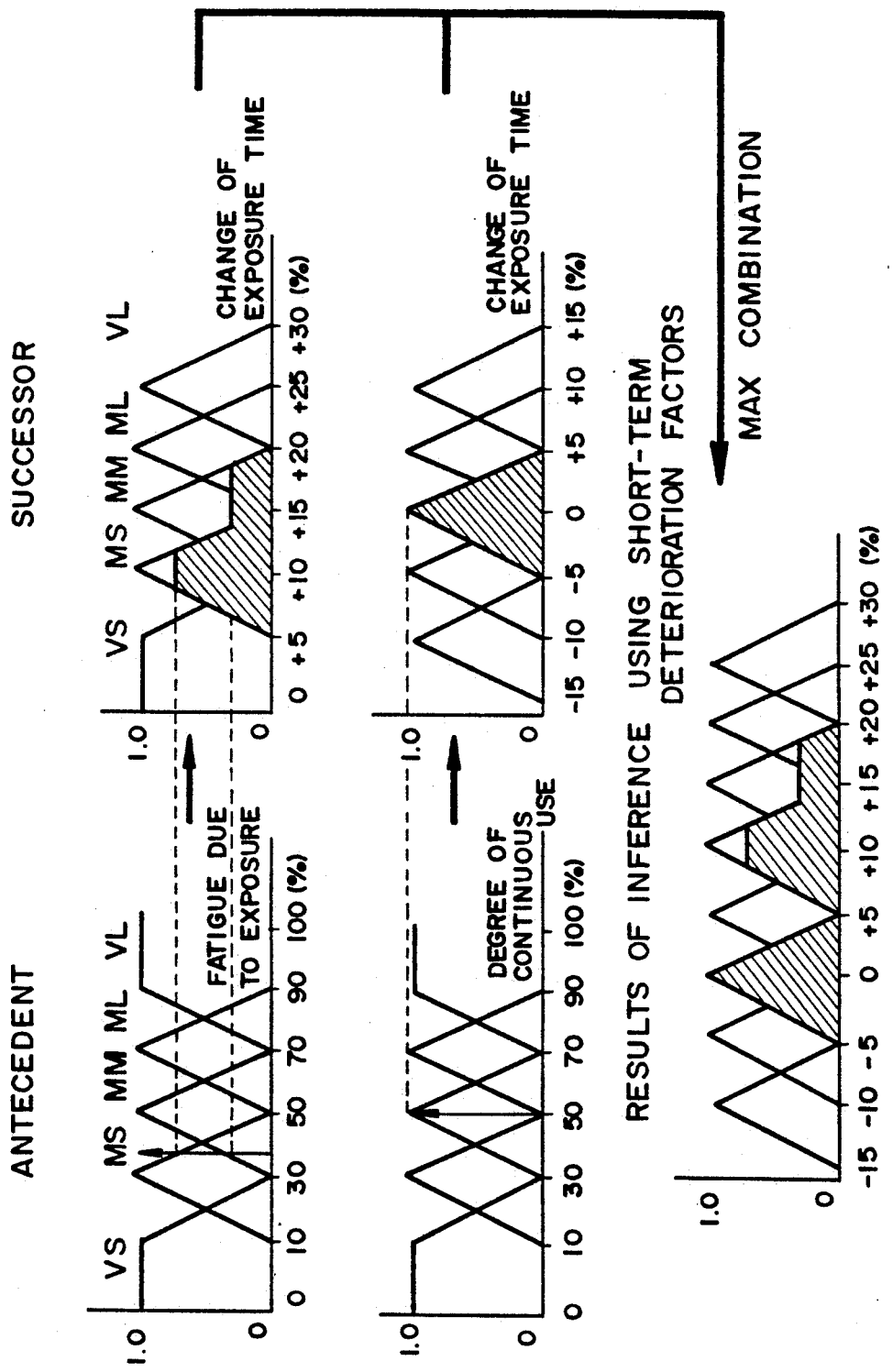
FIG. 13 shows a specific inference procedure with fuzzy rules for determining an amount of change of the duration of exposure on the basis of short-term deterioration factors of an electrophotographic copier in accordance with the present invention.

FIG. 13 shows fuzzy rules for determining an amount of change of the duration of exposure. The inference procedure will be described by using the rules associated with the fatigue due to exposure by way of example. In FIG. 13, when the fatigue due to exposure is 35% of the maximum rated value, MS and MM are used in the antecedent portion; membership functions corresponding to 35% of the antecedent portion are selected in the successor portion, as indicated by hatching. Likewise, membership functions corresponding to the wear of the drum 1, fatigue due to exposure, the degree of continuous use, temperature and humidity are obtained in the successor portion, as indicated by hatching. In the same manner, when the degree of continuous use is 50%, a membership function of the change of the duration of exposure is produced, as indicated by hatching. By the MAX combination of the two membership functions, it is possible to achieve short-term deterioration information.

Figure 15:
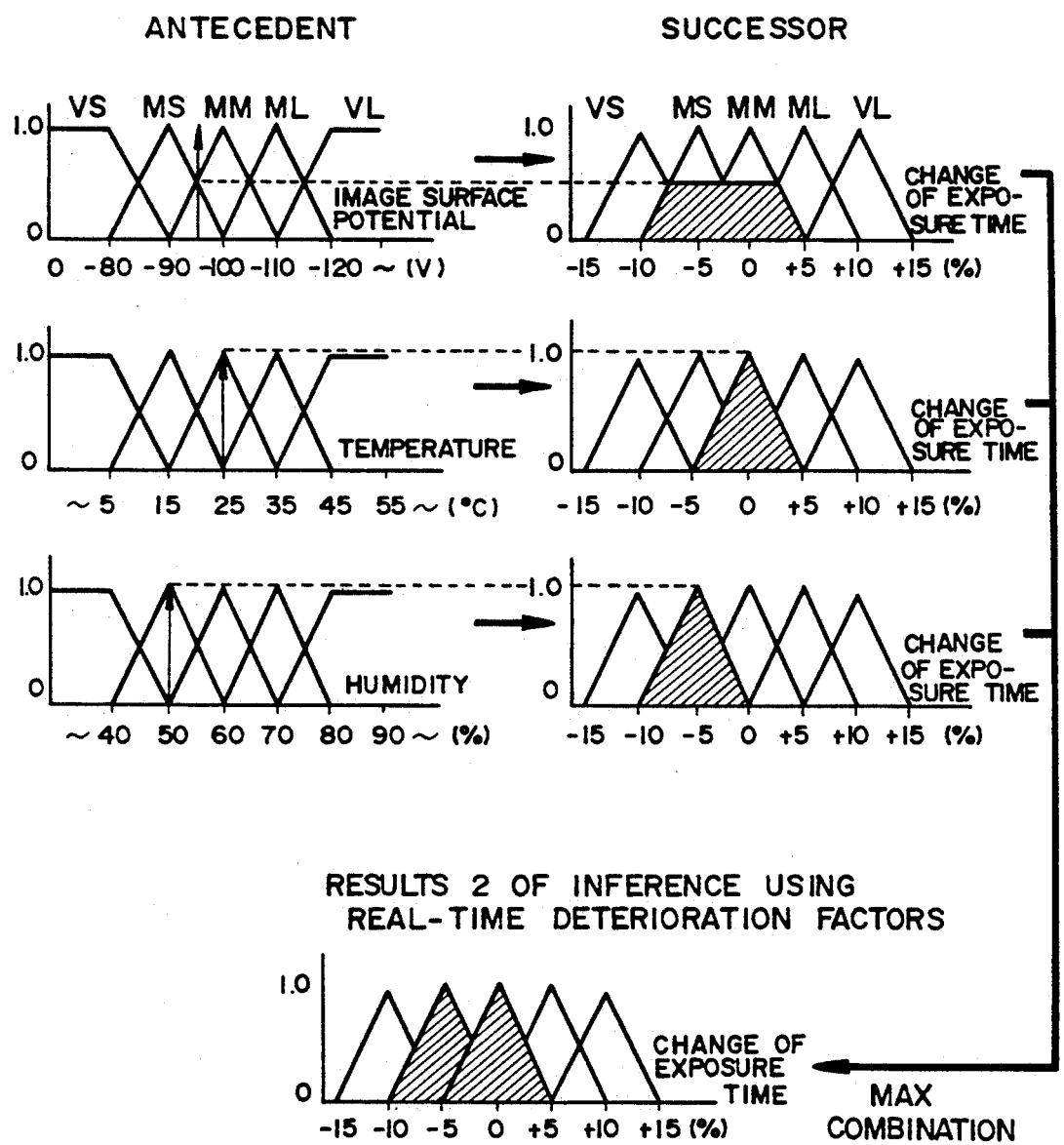
FIG. 15 shows a specific inference procedure with fuzzy rules for determining an amount of change of the duration of exposure on the basis of real-time deterioration factors of an electrophotographic copier in accordance with the present invention.

As shown in FIG. 15, real-time deterioration information is obtainable by a procedure similar to the above-stated procedure.

Figure 16:
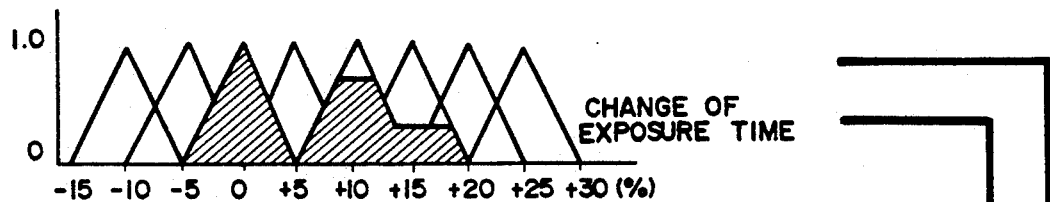
FIG. 16 demonstrates a procedure for determining a manipulation value of the duration of illumination by fuzzy inference as executed by an electrophotographic process control device in accordance with the present invention.
Figure 16:
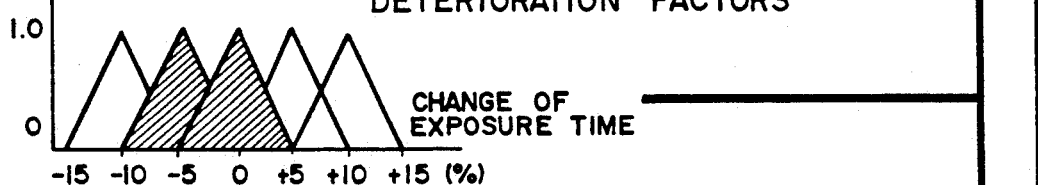
Figure 16:
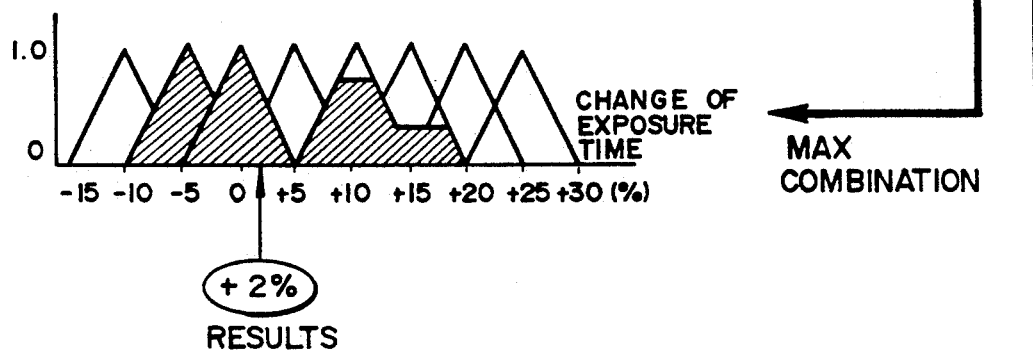
Figure 16:
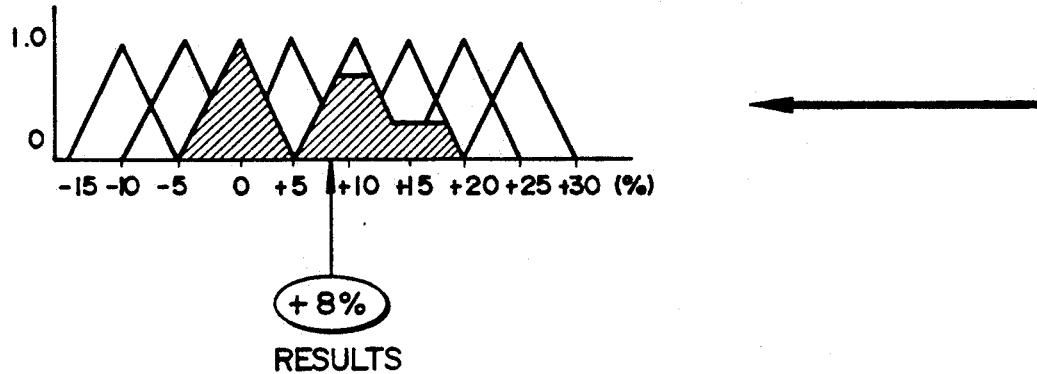

In FIG. 16, the membership function of the change of the duration of exposure is determined by the MAX combination of the results of the individual successor portions. The final manipulation value to be fed to a subject of control is produced by making the hatched portions of the membership function non-fuzzy.

The inference method slightly differs from the case with surface potential measurement to the case without it. In the former case, two membership functions of short-term and real-term deterioration information are subjected to MAX combination while, in the latter case, the final manipulation value is produced from short-term deterioration information only. This is because surface potential cannot be measured unless an exclusive pattern for measurement is formed between copying operations. More specifically, the potentials of an image area and a white area on the drum 1 cannot be measured with a desired document image and are measured by forming a predetermined pattern on the drum 1, resulting in the need for two kinds of determining methods.

In summary, it will be seen that the present invention provides an electrophotographic process control device which has a broad control range and prevents an apparatus from running out of control, since it executes optimum control with each of deterioration factors of a drum. A charger included in a charging section and the amount of exposure can be controlled on the basis of long-term and short-term deterioration factors without resorting to the measurement of surface potential of the drum. Delicate control is achievable with a plurality of deterioration factors of a drum. The invention can implement the process control over, for examples, copiers of different types by a simple change of fuzzy rules. The number of times that an exclusive pattern for surface potential measurement should be formed is reduced, increasing the copying speed. The invention saves time and cost for the development of copiers and other electrophotographic apparatuses. Although fuzzy inference is not practicable without increasing the number of rules by the input number power of the number of grades, the invention reduces the total number of rules by using two stages of fuzzy inference sections.

Various modifications will become possible for those skilled in the art after receiving the teachings of the present disclosure without departing from the scope thereof.

What is claimed is:

1. In an electrophotographic process control device, a control means for controlling a grid voltage and a duration of exposure of a light source, said control means comprising:
   means for, from among characteristics of a photoconductive drum used for an electrophotographic process including an amount of wear of said photoconductive drum, electrostatic fatigue of said photoconductive drum, fatigue due to exposure of said photoconductive drum, a degree of continuous use of said photoconductive drum, a total number of rotations of said photoconductive drum, a total amount of passed charge passed by said photoconductive drum, a total duration of exposure of said photoconductive drum and a number of copies per unit time of said photoconductive drum, defining for each characteristic a membership function, said means for defining providing a factor series as an output; and
   means for determining a successor portion, comprising fuzzy rules having two or more of the factor series as an antecedent portion and having said grid voltage and said duration of exposure of said light source as the successor portion, wherein control is effected with non-fuzzy values resulting from inference using said fuzzy rules.

2. A device as claimed in claim 1, where input parameters for calculating an amount of long-term deterioration comprise a drum current and a drum rotation counter;
   input parameters for calculating an amount of short-term deterioration comprises a duration of exposure and a number of copies per unit time;
   input parameters for calculating an amount of real-time deterioration comprises a surface potential, temperature, and humidity; and
   said device preparing fuzzy rules having said input parameters as an antecedent portion and said amounts of deterioration as a successor portion and effecting control by use of non-fuzzy values of the results of inference using said fuzzy rules.

3. A device as claimed in claim 1, wherein said device prepares fuzzy rules having an amount of long-term deterioration, an amount of short-term deterioration and an amount of real-time deterioration as an antecedent portion and a charge manipulation amount and an exposure manipulation amount as a successor portion and effects control by use of non-fuzzy values of the results of inference using said fuzzy rules.

4. A device as claimed in claim 1, wherein a manipulation amount is selectively changed for, among deterioration factors calculated using said fuzzy rules, a most effective deterioration factor.

5. In an electrophotographic process control device, comprising:
   means for classifying deterioration factors from among characteristics of a photoconductive element used for an electrophotographic process, said characteristics including an amount of photoconductive element wear, electrostatic fatigue of the photoconductive element, fatigue due to exposure of the photoconductive element, a degree of continuous use of the photoconductive element, temperature of the photoconductive element, humidity at the photoconductive element, and other drum deterioration factors, by a time range such as long-term/medium-term/day, or by a number-of-copy range such as great amount/medium amount/day-amount, membership functions being prepared for evaluating amounts representative of the deterioration of a photoconductor based upon sensor information including the photoconductive element surface potential, the photoconductive element current, and environment information including a number of copies, temperature of the photoconductive element and humidity at the photoconductive element; and
   means for applying fuzzy rules having said amounts representative of the deterioration of said photoconductor as an antecedent portion and having amounts of manipulation of a subject of control in a successor portion, control being effected by use of non-fuzzy values resulting from inference using said fuzzy rules.

6. A device as claimed in claim 5, wherein a manipulation amount is selectively changed for, among deterioration factors calculated by said fuzzy rules, 9 most effective subject of control.

7. An electrophotographic control device for controlling electrostatic image production on a photoconductive drum, comprising:
   photoconductive drum charge deterioration factor detecting means comprising,
   first detecting means for detecting long term factors affecting electrostatic charge on said photoconductive drum, said first detecting means outputting long term deterioration factor values,
   second detecting means for detecting short term factors affecting electrostatic charge on a photoconductive drum, said second detecting means outputting short term deterioration factor values,
   third detecting means for detecting real time factors affecting deterioration of charge on a photoconductive drum, said third detecting means outputting real time deterioration factor values;
   photoconductive drum deterioration determining means, comprising,
   first deterioration determining means, having an input coupled to receive an output of the first detecting means, for applying first fuzzy rules to said long term deterioration factor values, said first deterioration determining means outputting long term deterioration values,
   second deterioration determining means, having an input coupled to receive an output of the second detecting means, for applying second fuzzy rules to said short term deterioration factor values, said second deterioration determining means outputting short term deterioration values,
   third deterioration determining, having an input coupled to receive an output of the third detecting means, for applying third fuzzy rules to said real time deterioration factor values, said third deterioration determining means outputting real time deterioration values; and means, having inputs coupled to outputs of at least two of the first, second, and third deterioration determining means, for applying fourth fuzzy rules to at least two of the long term deterioration values, the short term deterioration values, and the real time deterioration values, for producing control data which is used to produce control signals for controlling exposure of the photoconductive drum.

8. A device according to claim 7, wherein:
the long term deterioration factors comprise electrostatic fatigue of the photoconductive drum and wear of the photoconductive drum.

9. A device according to claim 7, wherein:
the short term deterioration factors comprise fatigue of the photoconductive drum due to exposure and a degree of continuous use of the photoconductive drum.

10. A device according to claim 7, wherein:
the real time deterioration factors comprise surface potential of the photoconductive drum, temperature of the photoconductive drum, and humidity at the photoconductive drum.

11. A device according to claim 7, wherein:
said means for applying fourth fuzzy rules comprises digital image signal reading means for reading digital data corresponding to an image to be reproduced and means for modifying said digital data in accordance with said control data for producing said control signals.

12. A device according to claim 11, wherein said control signals comprise a grid voltage control signal for controlling a grid of a light source for application to the photoconductive drum and a duration of exposure signal for controlling a duration of exposure of the light source.

13. An electrophotographic process control device for controlling charging of a photoconductive drum, comprising;

first means for determining membership functions for determining an amount of deterioration of charging of the drum from at least two characteristics affecting charging of the drum which are selected from members of a group consisting of an amount of wear of the drum, electrostatic fatigue of the drum, fatigue due to exposure of the drum, a degree of continuous use of the drum, a total number of rotations of the drum, a total amount of charge passed by the drum, a total duration of exposure of the drum, and a number of copies per unit time imprinted onto the drum, wherein fuzzy rules are applied to said membership functions of the selected members to determine said amount of deterioration; and second means for determining, having an input coupled to an output of the means for defining, for determining a change in exposure of the drum to be produced by a light source, wherein fuzzy rules are applied to said amount of deterioration to provide exposure control signals for controlling exposure of the drum by the light source.

14. A device according to claim 13, wherein input parameters for the first means for determining comprise:
input parameters for calculating an amount of long term deterioration of the drum, comprising drum rotation and drum current; and
input parameters for calculating an amount of real time deterioration, comprising drum surface potential, drum temperature, and humidity at the drum.

15. A device according to claim 13, wherein said first means for determining comprises means for determining long term deterioration and outputting a long term deterioration value, means for determining a short term deterioration and outputting a short term deterioration value, and means for determining a real time deterioration and outputting a real time deterioration value, wherein each of the long term, short term, and real time deterioration values are determined by separately applying fuzzy rules to values of long term, short term, and real time deterioration characteristics, respectively.

* * * * *